Figure 1:
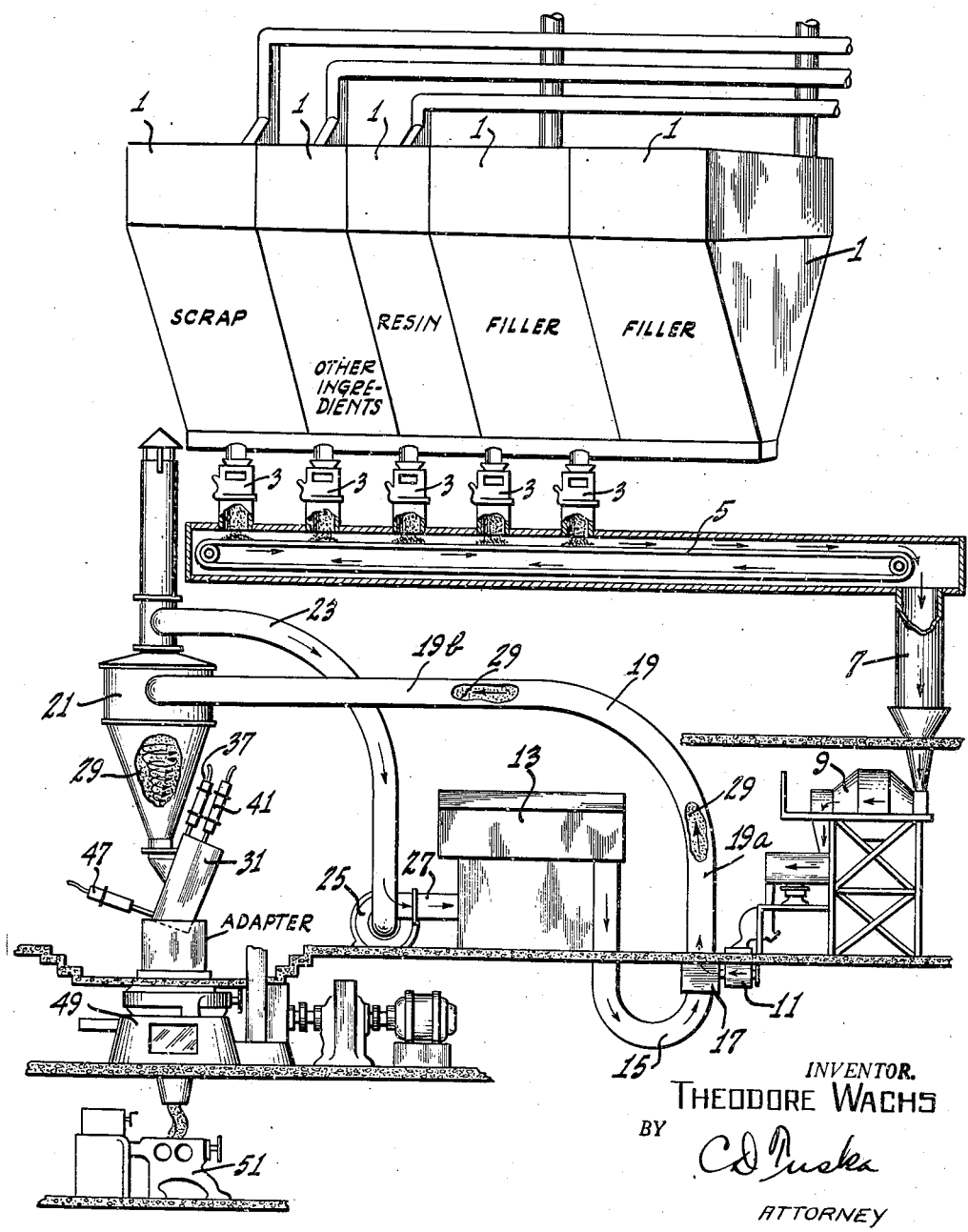

Oct. 25, 1949.  T. WACHS  2,486,346
APPARATUS FOR PLASTICATING THERMOPLASTIC MATERIALS
Filed Feb. 21, 1945  2 Sheets-Sheet 1

INVENTOR.
THEODORE WACHS
BY
ATTORNEY

Oct. 25, 1949.  T. WACHS  2,486,346
APPARATUS FOR PLASTICATING THERMOPLASTIC MATERIALS
Filed Feb. 21, 1945  2 Sheets-Sheet 2
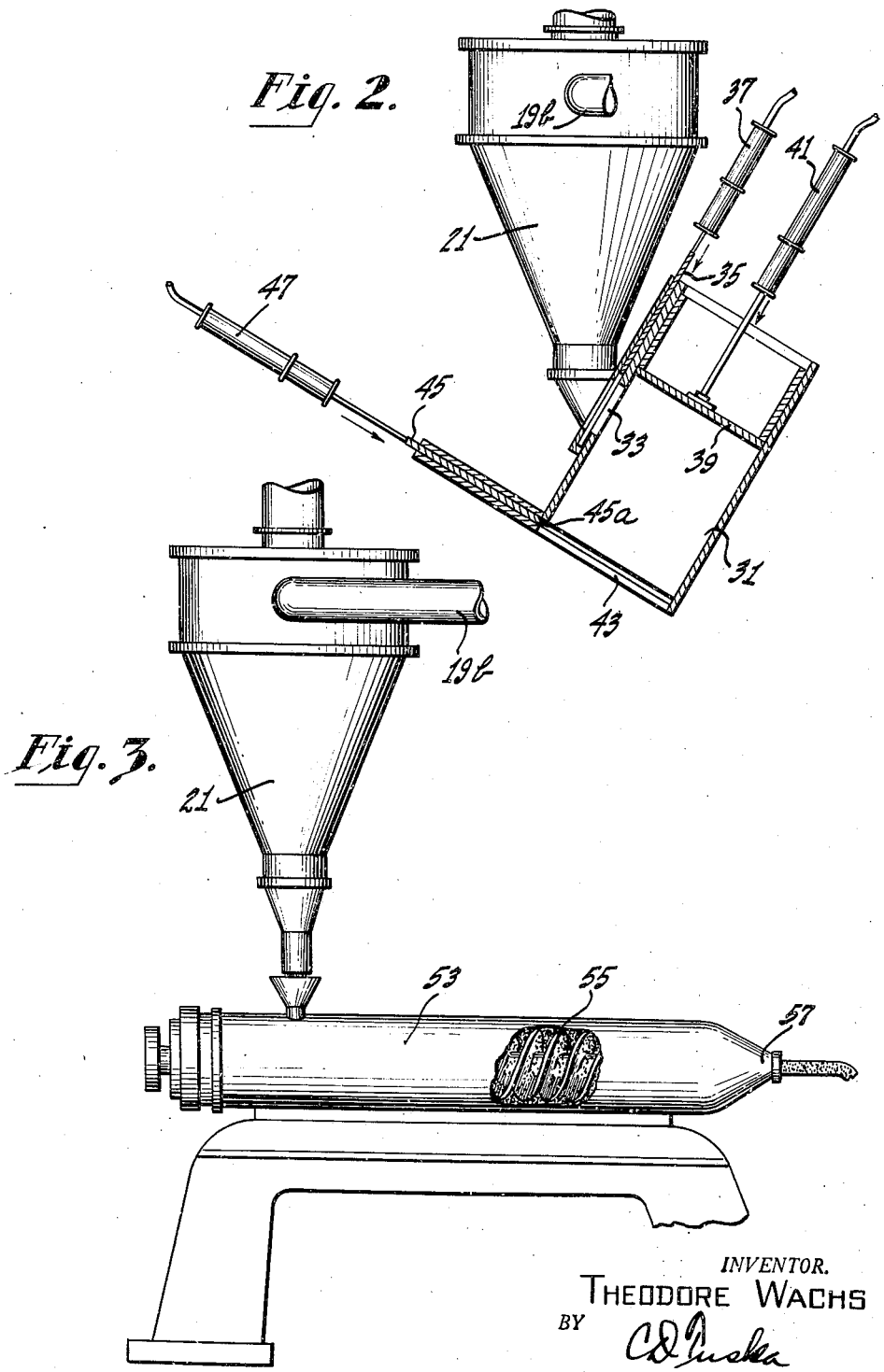
INVENTOR.
THEODORE WACHS
BY
ATTORNEY Patented Oct. 25, 1949

2,486,346

UNITED STATES PATENT OFFICE 2,486,346

APPARATUS FOR PLASTICATING THERMOPLASTIC MATERIALS

Theodore Wachs, Cynwyd, Pa., assignor to Radio Corporation of America, a corporation of Delaware Application February 21, 1945, Serial No. 579,095

5 Claims. (Cl. 18—4)

This invention relates to apparatus for plasticating normally solid, thermoplastic material, and more particularly to an improved apparatus for preheating a thermoplastic mass prior to the mechanical operation thereon which renders the mass plastic.

Materials which are thermoplastic in nature have found extensive use in many and varied fields. In general, a mass of solid, thermoplastic material is mixed with suitable fillers, pigments, lubricants, plasticizers, etc. and the mixture is heated and worked mechanically into a plastic mass suitable for molding. The thermoplastic material may be either a natural resin, such as shellac, or any one or more of a variety of synthetic resins, such as the phenol-formaldehyde resins, the vinyl resins, and the like.

One field in which extensive use is made of various thermoplastic materials, and particularly shellac, is the phonograph record industry. Here, as in other fields or applications, the plasticating process as heretofore carried out has had certain inherent limitations impairing the efficiency of the process, and, as a consequence, making this process relatively costly. For example, the compound from which phonograph records are made has been mixed to a formula of ingredients each of which is reduced to a finely pulverized state. The compound consists essentially of a thermoplastic resin (usually shellac) which may exist in the formula over a wide range, together with certain fillers, such as finely divided clays and finely divided limestones, as well as small amounts of copal gum, stearine, carbon black, etc. In each case, the fundamental or basic ingredients of the compound are (1) a thermoplastic resin, and (2) an inert filler. After mixing these ingredients in the dry or powdered state, the solid mixture must be transformed into a plastic state for molding. In the case of shellac, this requires, fundamentally, that the entire mass be heated to about 270° F., which is the temperature at which shellac will flow freely. Immediately thereafter, the ingredients are mixed under such a degree of pressure as will distribute the softened shellac very intimately throughout the entire mass of filler to the end that each particle of filler is actually enclosed in shellac. After such processing, the compound becomes a thermoplastic mass which can be rolled out on a sheeter to convenient thicknesses and sub-divided into units called "biscuits." The "biscuits" may then be passed either directly to the record presses where the commercial records are pressed, or they may be cooled and sent to storage for subsequent reheating and use. In either event, they remain thermoplastic in nature and will resoften upon being reheated. Once presented to a record pressing matrix in softened form, the "biscuits" can be molded to finished records.

It was fairly conventional in the record pressing industry for many years (and this was more or less true of other similar industries, also) to convert batches of about 200 pounds of the mixed powder to a plastic state on steam heated rolls somewhat simulating the process by which rubber was mixed with its several ingredients. While this process was fairly successful, it was very laborious since it required constant shoveling and reshoveling of the powder mixture back onto the rolls until it had acquired enough heat for the resin to become softened and begin its process of plastication into a single mass.

Batches of the mixed, powdered material have also been plasticated in steam heated, mechanical mixers which usually consist of cast steel, steam-jacketed casings within which two or more heavy rotors revolve. The powder mixture is applied to the rotors which, by a peculiar motion, force the powder under mechanical pressure alternately against the interior lining of the machine and then between themselves. This results in what may be described as a "mulling" or "putty-knifing" action on the powdered mixture while the mixture is being heated through the medium of the steam in the jacket. Fundamentally, therefore, the mechanical mixers involve the application of mechanical pressure to the mixture or charge simultaneously with the heating thereof. A customary charge or batch of about 470 pounds requires approximately six or seven minutes for its completion before the machine is dumped, and approximately the first half of the machine's batch cycle time is devoted to the heating of the stock.

While the mechanical mixers offer many advantages over the steam heated rolls, they are nevertheless subject to the disadvantages that they are expensive to install and operate and, even worse, are very poor forms of heating devices for the powdered charge. To heat an entire 470 pound charge from room temperature up to 270° F. requires that those portions of the charge adjacent to the steam heated jacket must become over-heated in order to provide a temperature differential which will insure the flow of heat to the remainder of the mass. This heating process, which requires some 3 to 3½ minutes, causes a considerable portion of the shellac to become polymerized to some forms of complex compound which are no longer thermoplastic and which are very hard. Pieces of such hard compounds have been known to go right through to the "biscuits," and not only do they not mold satisfactorily under pressure applied by the matrix, but they take an appreciable toll of matrix life.

The primary object of my present invention is to provide an improved apparatus for preheating a mass of solid, thermoplastic material prior to the working thereof into a plastic mass, which apparatus will not be subject to the disadvantages known to be present in prior art apparatus utilized for this purpose.

More particularly, it is an object of my present invention to provide an improved apparatus for preheating a solid mass of thermoplastic material prior to rendering the same plastic which will effect heating the mass substantially uniformly and with great rapidity to the end that the time required for the entire plasticating process will be greatly reduced.

Another object of my present invention is to provide an improved apparatus as aforesaid which will be relatively inexpensive both in initial cost and in use, and which will accomplish the desired results with great efficiency.

In accordance with my present invention, I reduce a solid mass of the material to be plasticated to a form presenting a very greatly enlarged superficial area and heat the material in the latter form by means of a stream of hot gas, such as air. Thus, the original mass may be reduced to small, thin flakes, or to a fine powder or dust which is preheated in a continuous stream for "flash heating," so to speak. In one form of heater, sheet steel piping may be connected to a suitable heating device for heating the air or other suitable gas therein, and the gas is blown through this pipe at a velocity of, say, five thousand feet per minute. The pipe terminates at its upper end in any suitable form of dust collector, such as a cyclone, for example, which separates the solid particles from the gas. The particles are introduced to the pipe at a point between the heating device and the cyclone separator at a predetermined rate by means of a suitable feeder, and the very finely divided particles are carried upwardly by the hot gas and have their temperature elevated almost instantaneously by the time they arrive at the cyclone. This phenomenon results from the fact that the mass of each particle to be heated is insignificant as compared with its surface area.

In the cyclone or other separator, the heated particles are separated from the now somewhat cooled gas stream and are forced by gravity to the mouth thereof whence they may be passed immediately to the hopper of an extrusion type plasticator, or, if desired, to a Banbury or other suitable mixer for plastication. The cooled gas leaves from the top of the cyclone and continues onward to the heater which reheats it, the hot gas thereafter being fed back to the cyclone and picking up more of the dust particles on its way. I have found that the compound can be passed all the way through such a system to the mouth of the cyclone and the particles heated to substantially the flow or plasticating temperature so rapidly that there has not been time for an agglomeration of the particles to a single mass, notwithstanding their elevated temperature. When such a heated mass of particles is passed into and through an extrusion type molding machine, for example, its plastication is completed and the material can be molded with no difficulty whatsoever. The process is continuous and the heating and plasticating cycle is very short in the case of any specific unit mass of the material. Moreover, I have found that the shellac or other resin which may be used does not suffer any appreciable degree of polymerization and that the completed compound is, generally speaking, more fluid and therefore more suitable for molding. If desired, the heated particles may be fed to a Banbury or other suitable mixer to be worked by the rolls into a unified, plastic mass suitable for either direct molding or for sheeting and formation of biscuits therefrom. In any case, my improved method makes it possible to produce a plastic mass with less resin content, with a higher and finer homogeneity, with less power consumption, with less labor, and hence at a lower cost, yet yielding a better product in the end.

The novel features that I consider characteristic of my invention are set forth with particularity in the appended claims. The invention itself, however, both as to its organization, as well as additional objects and advantages thereof, will best be understood from the following description when read in connection with the accompanying drawings, in which, Figure 1 is an elevational view, partly in section, of one form of apparatus utilizing my present invention, Figure 2 is an enlarged, detailed view, partly in section, of the cyclone separator and the material receiving housing connected to the outlet thereof, and Figure 3 is a fragmentary, detailed view of molding apparatus according to a preferred form of the present invention.

Referring more particularly to the drawings, wherein similar reference characters designate corresponding parts throughout, there is shown, in Figure 1, a number of supply bins 1 from which the solid ingredients to be compounded into a plastic mass are supplied. These ingredients may comprise (1) a resin, such as shellac, vinyl resin, or the like, (2) one or more fillers, (3) usually a certain amount of scrap material, and (4) certain other ingredients such as lubricants, plasticizers, and the like. These materials are all supplied to the bins 1 in a form in which the superficial area of the mass is exceedingly large compared to its volume. This form may be as fine dust particles, as flakes, or the like. In the case of fine dust particles, they may be ground to a size of the order of up to 40 microns. Thus, for a three inch cube of solid resin, for example, when it is ground down to a fine powder or dust of approximately the size indicated above, its superficial area will have been increased to approximately 200 square feet while the total mass, of course, remains the same in each case.

The several ingredients are fed from the bins 1 to automatic weighing machines 3 of any suitable type which weigh out prescribed amounts of each of the ingredients. The weighing machines 3 may be suitably interlocked for simultaneous, manual control, and the quantities of the materials weighed by them are supplied to an endless conveyor 5 which feeds the accumulated materials to a conduit 7 leading to a mixer 9. The output of the mixer 9 is supplied to a feeder 11 which may be a screw conveyor or the like.

The system for heating the fine dust particles supplied by the feeder 11 includes a heating device 13 to which is connected a pipe 15 leading to a feeding station 17. A pipe 19 having a vertical portion 19a and a horizontal portion 19b extends from the heating station 17 to a cyclone or other suitable separator 21 of a type adapted to remove from a gas any solid particles dispersed therein. A return pipe 23 connects the cyclone 21 with a powerful fan 25 the output of which is connected through a short pipe 27 to the input of the heater 13. Thus, the heater 13, the pipe 15, the feeding station 17, the pipe 19, the cyclone 21, the return pipe 23 the fan 25 and the short pipe 27 constitute and endless path for the passage of a stream of gas such as air, continuously around the system.

The air or other suitable gas may be heated to a temperature of about 280° F. and is forced through the system by the fan 25 at a speed of about 5,000 feet per minute. The fine particles fed by the feeder 11 to the feeding station 17 are picked up by the hot gas and they become dispersed therein so that the entire surface area of each particle becomes exposed to the hot gas which carries the dispersed particles through the pipe 19 to the cyclone 21. The feeding station 17 is located at such a point, considering the speed and temperature of the hot gas, that, from the time the hot gas picks up the dust particles 29 at the feeding station 17 until it introduces the particles 29 into the cyclone 21, these particles will have become heated to a temperature approximately the plasticating or flow temperature of the resin. In the case of shellac, for example, which flows at about 270° F., the hot gas may heat the fine particles 29 to temperatures within a range of from about 225° F. to 265° F. or thereabouts depending upon the degree of additional working or mulling to which the hot particles are to be subjected after they leave the cyclone 21. For other resins, the temperatures will, of course, be different. In any case, it will be apparent that the dust particles 29 are heated with great rapidity (in fact, almost instantaneously) while being advanced by the hot gas from the feeding station 17 to the cyclone 21.

The cyclone 21 serves to separate the hot particles 29 from the gas. The mixture of gas and dust particles is introduced into the cyclone tangentially, and the solid particles are forced around in a swirling, helical motion to the bottom of the cyclone, while the fan 25 draws the cooled gas through the return pipe 23 and feeds it back through the pipe 27 to the heater 13 which reheats the cooled gas and thereby replenishes the heat extracted from the gas by the particles deposited in the cyclone 21.

In the form of my invention shown in Figures 1 and 2, the hot particles which accumulate in the cyclone 21 drop therein, by gravity, and are fed to a housing 31 until a prescribed batch of material has accumulated. The housing 31 has an opening 33 which communicates with the lower, output end of the cyclone 21 and which can be closed off by a slide or gate 35 controlled by an air cylinder 37. Within the casing 31 is a plunger 39 controlled by an air cylinder 41 and movable within the housing 31, if necessary, to discharge an accumulated batch of hot particles through an opening 43 in the bottom thereof. The opening 43 can be closed by a slide or gate 45 which is controlled by an air cylinder 47. The air cylinders 37, 41 and 47 may be controlled to operate in timed relation by any suitable control mechanism not shown because it is immaterial to the present invention. Normally, the slide 45 is closed, the slide 35 is open, and the plunger 39 is at its uppermost position. Hence, the hot particles which drift down through the cyclone 21 fall through the opening 33 into the housing 31. When a prescribed batch of hot particles has accumulated in the housing 31, the slide 35 is automatically closed, the slide 45 is automatically opened, and the plunger 39 is automatically forced downwardly to discharge the batch through the opening 43 into a Banbury or other suitable mixer 49 which then works or mulls the hot particles into a unified, plastic mass. As soon as the batch is dumped or discharged from the housing 31, the slide 45, which may be provided with a knife edge 45a at its forward edge to slice the batch clean at the opening 43, is closed, the plunger 39 is raised, and the slide 35 is opened whereupon a new batch is deposited from the cyclone 21 to the housing 31. The unified, plastic mass produced by the mixer 49 may then be discharged to a sheeting machine 51 which forms the plastic mass into suitable sheets. These sheets may then be cut up and the portions thereof used either for directly molding desired articles therefrom or for storage and subsequent reheating prior to molding. Obviously, while a mass of the hot particles is being worked or plasticated by the mixer 49, another preheated batch may be accumulating in the cyclone 21 and the housing 31, thereby greatly reducing the overall plasticating cycle time.

Instead of feeding the hot particles 29 from the cyclone 21 through the housing 31 and thence to the mixer 49 for plastication, I prefer to feed the hot particles directly from the cyclone 21 to a suitable extrusion type molding machine 53, such as that illustrated in Figure 3. When such an arrangement is employed, the dust particles 29 are preferably heated to a temperature which closely approaches the plasticating temperature thereof so that the machine 53 will be required to perform a minimum amount of mechanical work on the hot particles to render them plastic. In any event, the machine 53 works the hot particles continuously into a unified, plastic mass and feeds this mass by means of a screw conveyor or the like 55 through a nozzle 57 where the plastic mass is formed into a useful article of desired shape. Of course, where the ultimate article is not to be formed by the molding machine 53, this machine may be used to extrude biscuits or the like useful for subsequent reheating and molding. In any case, it will be apparent that the total time during which the individual or discrete particles remain hot is very greatly reduced, thus greatly minimizing the possibilty of their polymerization since polymerization is a time-temperature phenomenon. This means, then, that an ultimate molded article of improved quality is obtained with my invention, and at much lower cost.

Although I have shown and described my invention in considerable detail, it will be apparent to those skilled in the art that many other variations thereof, as well as changes in the particular forms described herein, are possible. For example, the separator 21 need not necessarily be a cyclone separator but may be some other separator of any suitable type. Moreover, under certain circumstances, it may be desirable to so locate the feeding station 17 with respect to the separator 21 and thus so time the passage of the powdered material 29 that it would change its state into a plastic mass while still within the system shown in Figure 1 or immediately at the end thereof, or the cycle may be so arranged and timed that the change of state of the particles 29 from a solid to a plastic is incipient at the instant of leaving the cycle 21. Furthermore, while I have described the present invention with particular reference to the manufacture of phonograph records, it should be understood that that is merely exemplary and that the invention is applicable generally to the field of molding plastics. I therefore desire that my invention shall not be limited except insofar as is made necessary by the prior art and by the spirit of the appended claims.

I claim as my invention:

1. In apparatus for plasticating a mass of solid, thermoplastic material of particle size, the combination of a source of hot gas, a cyclone separator adapted to separate from said gas solid particles dispersed therein, means for directing a stream of said hot gas from said source to said separator along a certain path, means for introducing said particles into said stream at a point along said path whereby said particles will become dispersed in said hot gas and will be heated thereby while being delivered by said stream to said separator, said separator then serving to separate said heated particles from said gas, storage means associated with said separator for receiving and storing therein said separated, hot particles, and plasticating means associated with said storage means for thereafter receiving therefrom and effecting plastication of said hot particles into a unified, plastic mass.

2. In apparatus for plasticating a mass of solid, thermoplastic material of particle size, the combination of a heating device, a separator spaced from said heating device and adapted to separate from a gas solid particles dispersed therein, means providing an endless path which includes in succession said heating device and said separator, said means containing a gas therein, means for feeding said gas in a stream continuously around said path first to said heating device for heating said gas and then to said separator for separating from said gas any solid particles dispersed therein, means for introducing said particles into said stream at a point between said heater and said separator in the direction of flow of said stream whereby said particles will become dispersed in said hot gas and will be heated thereby while being delivered to said separator, said separator then serving to separate said particles from said gas, said gas feeding means thereafter returning said separated gas to said heating device for reheating thereof prior to being advanced to said point, storage means associated with said separator for receiving and storing therein said separated, hot particles, and plasticating means associated with said storage means for receiving therefrom and effecting plastication of said hot particles into a unified, plastic mass.

3. In apparatus for plasticating a mass of thermoplastic material of particle size, the combination of a source of hot gas, a separator adapted to separate from said gas solid particles dispersed therein, said separator including an outlet for solid particles, means for directing a stream of said hot gas from said source to said separator along a certain path, means for introducing said particles into said stream at a point along said path whereby said particles will become dispersed in said hot gas and will be heated thereby while being delivered by said stream to said separator, said separator then serving to separate said heated particles from said gas and to deliver said separated particles to said outlet thereof, a housing associated with said separator for receiving therefrom and temporarily storing heated particles delivered thereto from said separator, and means within said housing for periodically expelling therefrom the particles temporarily stored therein.

4. Apparatus according to claim 3 characterized in that said housing includes an inlet in communication with said separator outlet and an outlet for the particles temporarily stored therein, a first closure movable to and from closing position over said inlet and normally maintained out of closing position over said inlet, and a second closure movable to and from closing position over said housing outlet and normally maintained in closing position over said last named outlet, said expelling means comprising a plunger movable within said housing, and means associated with said closures and with said plunger for periodically closing said first closure to shut off the further supply of particles from said separator to said housing, opening said second closure, and advancing said plunger in said housing to thereby expel the particles accumulated therein.

5. In apparatus for plasticating a mass of solid, thermoplastic material of particle size, the combination of a heating device, a separator spaced from said heating device and adapted to separate from a gas solid particles dispersed therein, means providing an endless path which includes in succession said heating device and said separator, said means containing a gas therein, means for feeding said gas in a stream continuously around said path first to said heating device for heating said gas and then to said separator for separating from said gas any solid particles dispersed therein, and means for introducing said particles into said stream at a point between said heater and said separator in the direction of flow of said stream whereby said particles will become dispersed in said hot gas and will be heated thereby while being delivered to said separator, said separator then serving to separate said particles from said gas, and said gas feeding means thereafter returning said separated gas to said heating device for reheating thereof prior to being advanced to said point.

THEODORE WACHS.

REFERENCES CITED

The following references are of record in the file of this patent:

UNITED STATES PATENTS

| Number | Name | Date |
|---|---|---|
| 485,282 | Lang | Nov. 1, 1892 |
| 729,009 | Sutton et al. | May 26, 1903 |
| 1,448,430 | Brown | Mar. 13, 1923 |
| 1,558,751 | Nueske | Oct. 27, 1925 |
| 1,781,352 | Tolman | Nov. 11, 1930 |
| 1,980,499 | Pfaff | Nov. 13, 1934 |
| 2,235,324 | Moreland | Mar. 18, 1941 |
| 2,297,505 | Schmidberger | Sept. 29, 1942 |
| 2,300,042 | Caldwell | Oct. 27, 1942 |
| 2,308,632 | Stenberg | Jan. 19, 1943 |
| 2,340,834 | Hanson | Feb. 1, 1944 |